UNITED STATES PATENT OFFICE.

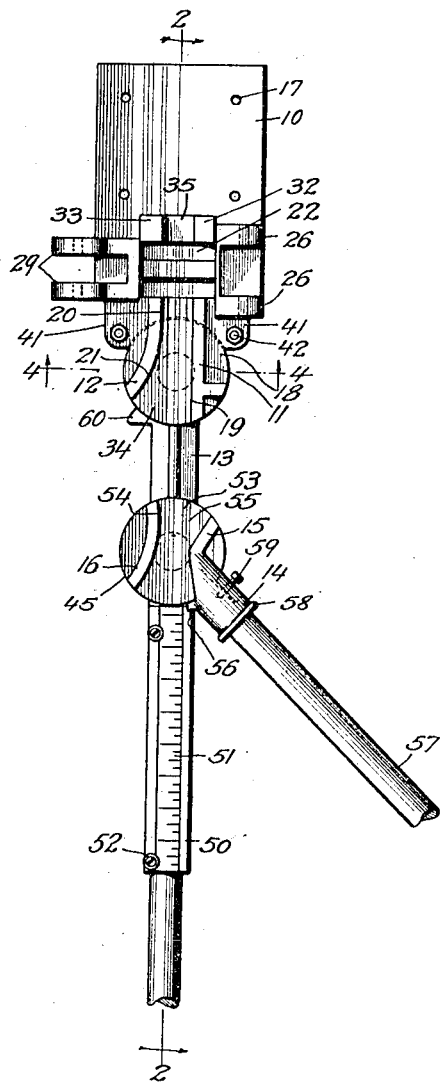
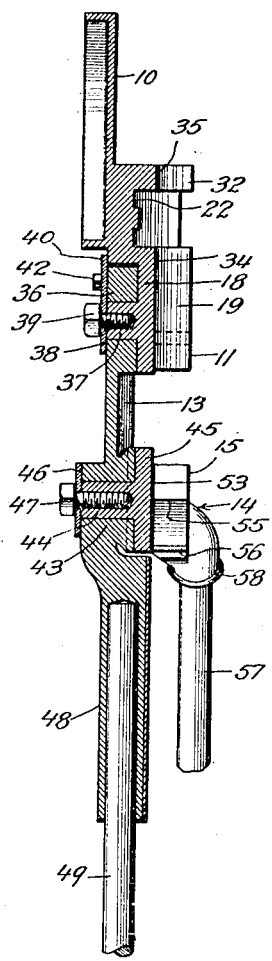

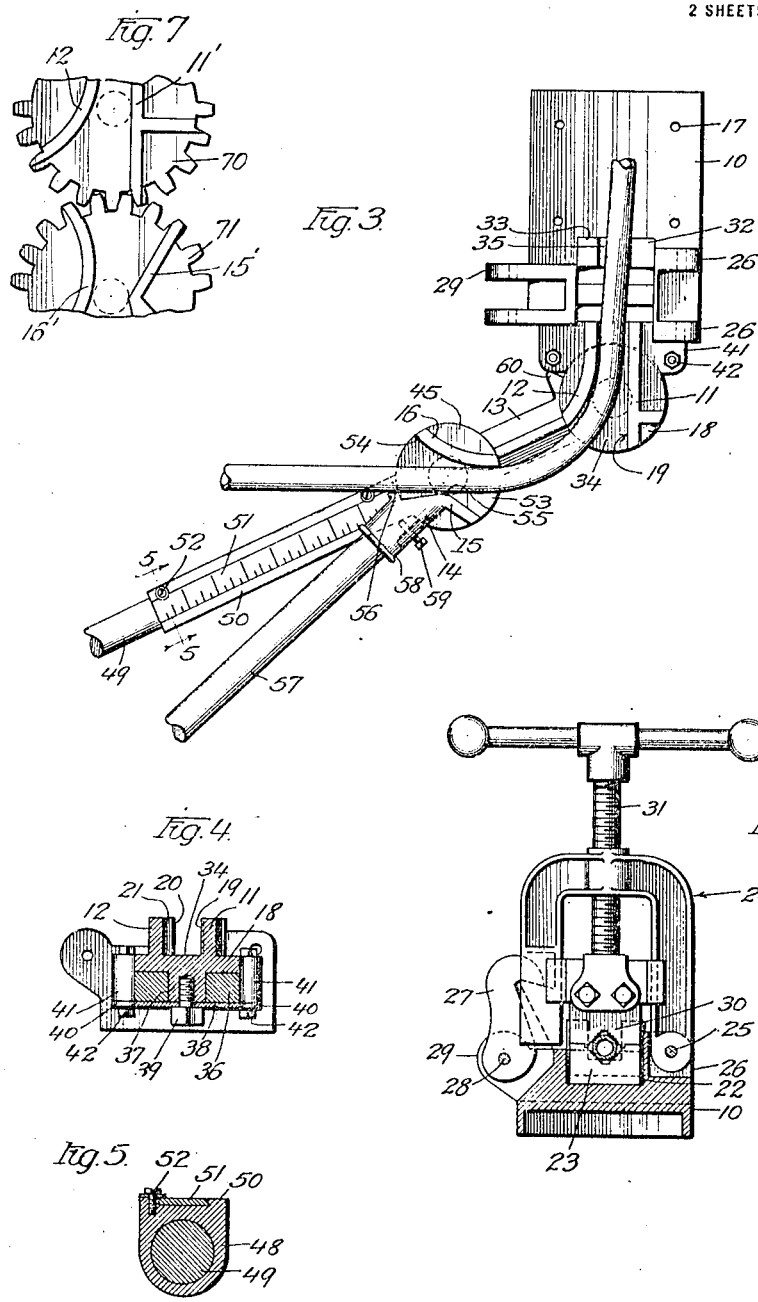

CONRAD GRUNHOW, OF CHICAGO, ILLINOIS.

PIPE-BENDING APPARATUS.

1,285,987.         Specification of Letters Patent.         Patented Nov. 26, 1918.

Application filed September 17, 1917.   Serial No. 191,664.

*To all whom it may concern:*

Be it known that I, CONRAD GRUNHOW, a citizen of the United States, residing at Chicago, in the county of Cook and State of Illinois, have invented certain new and useful Improvements in Pipe-Bending Apparatus, of which the following is a specification.

This invention relates to improvements in pipe bending apparatus and more particularly to a manually operable bender such as is particularly adapted for the formation of bends in electrical conduits.

One of the objects of my invention is to provide a pipe bender in which the relatively movable parts engage the pipe at spaced-apart points in such a manner as to prevent flattening of the intermediate unsupported section of the pipe in which the curve is formed.

Another object of my invention is to provide such a device in which the pipe may be manipulated without the necessity of clamping or fastening it in place, thus greatly facilitating its insertion and removal.

Still a further object of the invention is to provide such a bender in combination with the pipe holding vise and measuring scale by means of which the various operations of threading the pipe, measuring the distance from the end to the bend, and the bending itself may all be accomplished without removing the pipe from this one apparatus.

Still other and further objects will become readily apparent to those skilled in the art from a consideration of the following description and drawing wherein;

Figure 1 is a plan view of my improved pipe bender ready for the insertion of the pipe.

Fig. 2 is a longitudinal, vertical sectional view on the line 2—2 of Fig. 1.

Fig. 3 is a plan view of my pipe bender after the completion of its bending operation.

Fig. 4 is a vertical, transverse sectional view on the line 4—4 of Fig. 1.

Fig. 5 is a vertical, transverse sectional view on the line 5—5 of Fig. 3.

Fig. 6 is a vertical, transverse sectional view through the bench-plate showing a pipe vise mounted thereon.

Fig. 7 is a fragmentary plan view of a modified form of apparatus.

In the most commonly used pipe benders an arcuate die or former is provided with a semicircular groove into which the pipe is forced. One end of the pipe is secured by a clamp at one end of the die and an arm pivoted to the die usually carrying a roller is then swung about its pivot forcing the pipe around the die. It will be apparent that if such a die were not provided with a concave groove, a pipe thus acted upon would be flattened instead of retaining its transverse circular form. Similarly if the pipe is gripped at one point and no die provided, but a bending action exerted at its spaced-apart point, an irregular curve would be formed taking the form of a sharp flattened bend.

This above described operation may be graphically pictured by the reader if he will consider his two hands as spaced apart and gripping a section of thin tubing such as may be easily bent. Holding one hand fixed and swinging the other hand in an arc about the fixed hand as a center, it is apparent that one cannot secure a smooth, even bend. Now consider a similar condition with the operator's thumbs projecting from his fists toward each other so as to engage the pipe at points within the points at which the bending strain is applied. Now move one hand about the other and at the same time give a slight rotary movement to the moving hand, pushing the thumb outwardly. It will then be noted that an upsetting action takes place permitting a smooth, even bend in the unsupported portion of the pipe without any flattening or deformation of its circular cross section. It is upon such a theory that I have evolved the herein described pipe bending machine of which the drawings illustrate a preferred embodiment though I do not wish to be limited to this specifically described form as it is obvious that various modifications and changes may be made therein, within the spirit of the invention.

In Fig. 1, I have illustrated the pipe bending machine embodying my invention and comprising in general a bench-plate or base 10 carring at its forward edge a pair of spaced-apart vertical ribs 11 and 12 between which to receive one portion of the pipe. An arm 13 is pivoted to the bench plate and carries in turn a pivoted arm 14 at the pivotal part of which is provided a pair of upstanding pipe receiving ribs 15 and 16. These pairs of ribs comprise the two channels within which the pipe may be laid and on swinging the arm 14 about its pivot until a stop point is reached, the arm 13 is thereupon swung upon its pivot point bending the pipe into the configuration shown in Fig. 3. These ribs are shaped as I will later describe so as to insure the above referred to upsetting effect, eliminating the tendency to cross-sectional distortion and insuring a smooth, even bend.

Taking up now the description of the apparatus somewhat more in detail, it will be noted that the bench-plate 10 is of generally rectangular form having holes 17 to receive fastening means for securing it to any suitable fixed support. A horizontal disk 18 is formed integral with the base plate 10 extending forwardly therefrom and is provided on its upper surface with the afore mentioned ribs 11 and 12, the former of which provides a straight wall 19 and the latter of which extends from a straight parallel portion 20 opposite the rear end of wall 19 bending or curving outwardly in a smooth arc as at 21 and terminating at the periphery of the disk. At the rear of the ribs 11 and 12 a recess 22 is provided to receive the lower jaws 23 of a standard pipe vise indicated in general at 24 one side of which is pivoted on a pin 25 between a pair of upstanding ears 26 cast integral with the bench plate. The other side of the vise is engaged and held in position by a hook 27 pivoted on a bolt 28 carried between the outstanding ears 29. The upper jaw 30 of the vise is actuated by the hand screw 31. When the vise is to be used it is positioned as indicated in Fig. 6 but may be readily swung to one side upon the pivot bolt 25 by releasing the hook 27.

At the rear of the recess 22 I have provided an additional pair of upstanding ribs 32 and 33 between which the pipe is laid. A pipe positioned for bending rests upon the upper surface 34 of the disk 18 and also upon the horizontal surface 35 between the two ribs 32 and 33.

The lever 13 is enlarged at its inner end to provide a disk-like head 36 bored out to receive and be journaled upon a downwardly extending hub 37 formed on the bottom of the disk 18. A plate 38 underlies the hub 37 and head 36 holding the same in the position shown in Fig. 2 by means of the bolt 39 fitting into the center of the hub. Side wings 40 extend from the plate 38 and underlie the projections 41 extending outwardly from the rear portion of the plate 18 being secured thereto by means of the bolts 42 thus preventing rotation of the plate as the lever is actuated.

At a point intermediate the ends of the lever 13 I have provided a hub 43 bored out to receive and provide a journal for the downwardly extending stub shaft 44 formed integral with a circular plate 45 forming part of the arm 14. A washer 46 is secured by means of bolt 47 under the hub and shaft so as to hold the two in rotative engagement. The outer end 48 of lever 13 is bored out to receive a detachable handle 49, and is flattened on its upper surface 50 to receive an adjustable scale 51 detachably secured thereto by means of the screws 52.

The pipe receiving surface 53 of the plate 45 is bounded by the two ribs 15 and 16 heretofore described, the latter having an arcuately formed vertical wall 54 and the former an inner wall formed of two vertical planes intersecting at approximately the center of the plate on a line 55. A lug 56 projects slightly into the pipe receiving channel from the rear edge of the rib 15. The plate 45 is manipulated by a detachable handle 57 which fits into a socket 58 formed integral with the plate and its movement with respect to the lever 13 is limited in the bending operation by means of an adjustable stop-screw 59, as shown in Fig. 3.

In a modified form of the apparatus illustrated in Fig. 7, I have shown a machine adapted more particularly for bending heavier pipes, and in which the two pipe supporting parts carrying the ribs 11'—12' and 15'—16' are provided with intermeshing geared segments 70, 71. With such an arrangement it is evident that as the movable member is swung about the fixed member as a pivot, the moving member will inevitably be turned through the proper angle on its own axis.

The operation of the apparatus is as follows:

A pipe such as an electrical conduit in which a bend is to be formed is laid within the channel formed between the ribs 15, 16 and 11, 12, with its outer end positioned upon the scale 51 to determine the distance from the end at which the bend is to be located. The handle 57 is then grasped by the operator and swung into the position shown in Fig. 3, the pipe as it is bent permitting slight rotation of the handle 57 with respect to the lever 13 until the stop 59 engages with the lever. A stop 60 is formed integral with the lever 13 near the head 36 for engagement with the outstanding lug 41 of the bench-plate so as to limit the extent of the bend thus insuring a right angle curve. The pipe at its outer end is engaged by the vertical walls of the ribs 15 and 16 at spaced apart points indicated in Fig. 3 and at its other end the pipe engages spaced-apart points on the ribs 32 and 12. This engagement of the bending instrumentalities with the pipe at slightly spaced apart points at each side of the section to be bent, at the same time leaving the intermediate section unsupported together with the slight rotary movement of the movable pair of pipe engaging elements, permits the upsetting movement above referred to and results in a smooth, even bend without deformation of the cross sectional shape of the pipe.

It will be evident from the above that the radius of curvature may be altered by changing the shape of the channels within which the pipe rests so as to bring the points of engagement with the pipe nearer or farther apart. A reversal in the operation of the machine will cause the straightening of a pipe section in which a bend has been made.

The vise forms an addition to the machine permitting the threading or cutting of a pipe without removing it from the apparatus which may then be used for measuring and bending.

Having described my invention, what I claim is:—

1. An apparatus of the character described for bending pipe or other hollow articles into a curve, including in combination a stationary element having means for engaging at points spaced apart longitudinally from each other, a pipe or other hollow article to be bent into a continuous curve, at one end of the curve, another element pivoted to swing about said stationary element and also having means for engaging at points spaced apart longitudinally from each other, the pipe or other hollow article to be bent at the other end of the curve, certain of said engaging means engaging said articles to be bent at points within the curve to prevent flattening of the intermediate unsupported portion of the article in which the curve is formed.

2. An apparatus of the character described for bending a pipe or other hollow article into a curve, including in combination a stationary element having a plurality of flange elements spaced apart and adapted to receive a pipe or other hollow article whose diameter is less than the distance between said elements, said elements being adapted to engage said pipe or other hollow article at points spaced apart longitudinally from each other at one end of the continuous curve in which said pipe or other hollow article is to be bent, another member pivoted to swing about said stationary element, said other member also having pipe engaging elements which are separated a distance greater than the diameter of the pipe to be operated upon and adapted to engage the pipe or other hollow article at points spaced apart longitudinally from each other and at the other end of the curve in which the pipe or other hollow article is to be bent.

3. An apparatus of the character described for bending a pipe or other hollow article into a curve, including in combination a stationary member, an additional member pivoted to swing about said stationary member, each of said members having elements adapted to engage the pipe or other hollow article to be bent into a curve at points spaced apart longitudinally from each other along the length of the pipe or other article, the pipe engaging element on the movable member having an independent movement relative thereto to form the initial part of the bend before the movement of the pivoted member to complete the bend.

4. An apparatus of the character described for bending a pipe or other hollow article into a curve, including in combination, a stationary member and a movable member pivoted to said stationary member to swing thereabout, an arm pivoted to said movable member and having a limited movement relative thereto, a plurality of elements on said stationary member spaced apart a distance greater than the diameter of the pipe or other hollow article to be bent into a continuous curve and adapted to engage the pipe or other hollow article at points spaced longitudinally along the same and on opposite sides thereof, and at one end of the curve to be formed, and engaging elements on said arm spaced apart a distance greater than the diameter of the pipe or other hollow articles and adapted to engage the same at points spaced apart lengthwise of the pipe or other article and on opposite sides of the same and at the other end of the curve to be formed.

5. An apparatus of the character described including in combination a fixed member, a movable member pivoted to swing about said fixed member, an arm pivoted to said movable member to have a limited movement relative thereto, a pair of flange elements on said fixed member spaced apart a distance greater than the pipe or other article to be bent, a second pair of elements on said fixed member also spaced apart a distance greater than the diameter of the pipe or other article to be bent, one of said last mentioned elements being substantially straight for the entire length thereof and the other of said last mentioned elements having the outer portion thereof curved in a smooth arc, said elements being adapted to engage the pipe or other article to be bent at points spaced apart lengthwise thereof, and additional elements on said arm spaced apart a distance greater than the diameter of the pipe or other article to be bent and adapted to engage the same at points spaced longitudinally thereof, one of said last mentioned elements being of arcuate shape and the other having a pair of walls arranged at an angle to each other and converging to an apex.

6. An apparatus of the character described for bending pipe or other hollow articles into a curve, including in combination, a stationary member, a member movable about said stationary member, an arm pivoted to said movable member and having a limited rotary movement relative thereto, to form the initial part of the curve, pipe engaging elements on said stationary member adapted to engage the pipe at points spaced apart longitudinally of the same at one end of the curve, the pipe engaging elements on said arm adapted to engage the pipe at points spaced apart longitudinally of the same at the other end of the curve.

7. An apparatus of the character described including in combination a stationary member, a movable member pivoted to swing about said stationary member, an arm pivoted to said movable member and adapted to have a limited movement relative thereto, a pipe receiving channel construction on each of said stationary members and said arms, each channel being of a width greater than the diameter of the pipe to be operated upon so that the flanges of said channel engage the pipe at points on opposite sides thereof and spaced apart longitudinally of the pipe.

8. An apparatus of the character described including in combination a stationary member, having two pairs of pipe engaging elements spaced apart from each other, each pair of pipe engaging elements being spaced apart a distance greater than the diameter of the pipe to be bent, a hub extending downwardly from said stationary member, a lever having an enlarged head journaled upon said hub so that said lever is pivotally mounted to swing about said stationary member, and means to limit the movement of said lever relative to said stationary member, an arm provided with a depending hub fitting in an intermediate part of said lever, so that said arm has a pivotal movement relative to said lever, means for limiting the movement of said arm relative to said lever, and pipe engaging elements on said arm, said pipe engaging elements being spaced apart a distance greater than the diameter of the pipe to be bent so as to engage the pipe at points spaced apart longitudinally of the same.

9. An apparatus of the character described for bending pipe or other hollow articles into a curve including in combination a stationary member, a movable member pivoted to swing about said stationary member, engaging elements on said stationary member and on said movable member adapted to engage a pipe or other hollow article to be bent, certain of said elements engaging the pipe or other article to be bent at points within the curve to be formed and near the ends thereof.

10. An apparatus of the character described for bending pipe or other hollow articles into a curve including in combination a stationary member, a movable member pivoted to swing about said stationary member, engaging elements adapted to engage the opposite sides of a pipe or other article to be bent on said stationary member located adjacent the pivotal connection between said movable member and said stationary member and additional engaging elements mounted for rotary movement on said movable member, certain of said engaging elements being adapted to engage the pipe on the inside of the curve to be formed and near the ends thereof.

11. An apparatus of the character described for bending a pipe or other hollow article into a curve, including in combination, a stationary member, a movable member pivoted to swing about said stationary member, an arm pivoted to said movable member for independent rotary movement relative thereto, engaging elements secured to said stationary member adjacent the pivotal point of said movable member thereto, and engaging elements on said arm located adjacent the point of pivotal connection of said arm to said movable member, said engaging elements engaging the pipe or other hollow article near the end of the curve to be formed only and certain of said engaging elements being adapted to engage the pipe on the inside of the curved part.

12. An apparatus of the character described including in combination a stationary member, a movable member pivoted to swing about said stationary member, an arm pivoted to said movable member for rotary movement relative thereto, engaging elements secured to said stationary member adjacent the pivotal point of said movable member thereto, and engaging elements on said arm located adjacent the point of pivotal connection of said arm to said movable member, certain of said elements being curved and adapted to engage the pipe or other article to be bent at points adjacent the ends of the curve to be formed therein leaving an unsupported portion therebetween.

In testimony whereof I hereunto set my hand.

CONRAD GRUNHOW.

Copies of this patent may be obtained for five cents each, by addressing the "Commissioner of Patents, Washington, D. C."